United States Patent
Sersland et al.

(10) Patent No.: US 7,503,607 B2
(45) Date of Patent: Mar. 17, 2009

(54) RETRACTABLE ENCLOSURE FOR SMALL LAND VEHICLE

(76) Inventors: Jerry Sersland, 1402 11th Ave. South, Grand Forks, ND (US) 58201; Conrad Sersland, 703 N. 19th St., Grand Forks, ND (US) 58203; Curt Wilcox, 1923 8th Ave. North, Grand Forks, ND (US) 58203

( * ) Notice: Subject to any disclaimer, the term of this patent is extended or adjusted under 35 U.S.C. 154(b) by 192 days.

(21) Appl. No.: 11/702,748

(22) Filed: Feb. 6, 2007

(65) Prior Publication Data

US 2008/0185860 A1    Aug. 7, 2008

(51) Int. Cl.
*B60P 3/32* (2006.01)
*B62D 33/06* (2006.01)

(52) U.S. Cl. .............. 296/26.09; 296/24.3; 296/190.04

(58) Field of Classification Search ................ 43/1; 135/88.05, 88.09; 180/89.13; 296/24.3, 296/24.32, 26.08, 26.09, 80, 83, 98, 102, 296/103, 159, 165, 175, 176, 190.04
See application file for complete search history.

(56) References Cited

U.S. PATENT DOCUMENTS

| | | | | |
|---|---|---|---|---|
| 724,593 | A * | 4/1903 | Martin | 296/83 |
| 1,024,634 | A * | 4/1912 | Klell | 296/103 |
| 2,486,734 | A * | 11/1949 | Campbell | 296/102 |
| 2,895,572 | A * | 7/1959 | Brinck | 52/71 |
| 3,124,386 | A * | 3/1964 | Jonas | 296/176 |
| 3,283,452 | A * | 11/1966 | Hayes | 52/29 |
| 3,360,295 | A * | 12/1967 | Reynolds | 296/190.04 |
| 3,542,414 | A * | 11/1970 | Nelson | 296/165 |
| 3,554,595 | A * | 1/1971 | Wolff | 296/26.09 |
| 3,649,063 | A * | 3/1972 | Stark | 296/159 |
| 3,697,123 | A * | 10/1972 | Gygrynuk | 296/24.32 |
| 4,614,252 | A | 9/1986 | Tarner | |
| 4,625,831 | A | 12/1986 | Rodgers, Jr. | |
| 4,773,694 | A * | 9/1988 | Gerber | 296/77.1 |
| 4,787,477 | A | 11/1988 | Dolan | |
| 4,800,986 | A | 1/1989 | Hayes, III | |
| 4,858,986 | A * | 8/1989 | Whitley et al. | 296/165 |
| 4,938,523 | A * | 7/1990 | Camp | 296/159 |
| 4,950,017 | A * | 8/1990 | Norton | 296/77.1 |
| 4,969,374 | A | 11/1990 | Borromeo | |
| 5,018,778 | A * | 5/1991 | Goble | 296/159 |
| 5,102,179 | A * | 4/1992 | Royer | 296/26.06 |
| 5,174,622 | A * | 12/1992 | Gutta | 296/77.1 |
| 5,203,601 | A | 4/1993 | Guillot | |
| 5,297,844 | A | 3/1994 | Haustein | |
| 5,339,852 | A | 8/1994 | Bull | |
| 5,509,717 | A | 4/1996 | Martin | |
| 5,720,312 | A * | 2/1998 | Scheuermann | 135/88.09 |

(Continued)

*Primary Examiner*—Glenn Dayoan
*Assistant Examiner*—Paul A Chenevert
(74) *Attorney, Agent, or Firm*—Kinney & Lange, P.A.

(57) ABSTRACT

A portable, retractable, and removable enclosure is installed on a lightweight open vehicle such as an all terrain vehicle (ATV). Guide track sections are mounted on the front and rear of the vehicle to define longitudinal guides. The enclosure includes a pair of rails that engage the guides. The enclosure can be moved between a forward position and a rearward position by moving the rails along a track defined by the guides. In the forward position, the enclosure is positioned over the vehicle and forms a cab. In the rearward position, a forward portion of the enclosure is positioned over the vehicle and a rearward position extends behind the vehicle to form an enclosure for hunting, camping, or fishing.

20 Claims, 17 Drawing Sheets

U.S. PATENT DOCUMENTS

| | | |
|---|---|---|
| 5,735,566 A | 4/1998 | Bradley |
| 5,864,991 A * | 2/1999 | Burns ............................ 52/67 |
| 5,961,175 A * | 10/1999 | Clardy, Jr. ................... 296/102 |
| 6,105,721 A | 8/2000 | Haynes |
| 6,206,446 B1 | 3/2001 | Slayden |
| 6,439,637 B1 * | 8/2002 | Tyrer ........................... 296/79 |
| 6,439,645 B1 | 8/2002 | Pedersen |
| 6,530,617 B2 | 3/2003 | McElwee et al. |
| 6,543,830 B1 | 4/2003 | Stuck |
| 6,550,575 B2 | 4/2003 | Spencer et al. |
| 6,604,606 B1 | 8/2003 | McDougal et al. |
| 6,802,327 B2 | 10/2004 | Koss |
| 6,811,204 B2 | 11/2004 | Long |
| 6,817,647 B1 | 11/2004 | Green |
| 6,902,220 B2 * | 6/2005 | Moskos et al. ................. 296/79 |
| 6,905,159 B1 * | 6/2005 | Saito et al. ............... 296/65.01 |
| 6,910,492 B1 | 6/2005 | Stuck |
| 6,929,302 B1 * | 8/2005 | Demick et al. ........... 296/26.01 |
| 6,994,388 B2 * | 2/2006 | Saito et al. ................. 296/26.1 |
| 2001/0035666 A1 * | 11/2001 | Allen ........................ 296/136 |
| 2002/0125730 A1 * | 9/2002 | Burks et al. .................... 296/98 |
| 2004/0021333 A1 | 2/2004 | Hancock |
| 2006/0049652 A1 * | 3/2006 | Martin .................... 296/26.08 |

* cited by examiner

RETRACTABLE ENCLOSURE FOR SMALL LAND VEHICLE

BACKGROUND OF THE INVENTION

The present invention relates to a structure that can be installed on a small motorized land vehicle, such as an all terrain vehicle (ATV), UTV, A-ATV, golf cart, garden tractor, dune buggy, go cart, or riding mower. In particular, the invention relates to an enclosure that is mounted on a vehicle and is movable between multiple positions to act as a vehicle cab, or as a hunting blind, camping enclosure, privacy enclosure or fishing shelter.

Small and lightweight motorized vehicles, such as all terrain vehicles (ATVs), have gained great popularity in the past twenty years. ATVs can be used, for example, to transport a hunter and gear to a hunting site.

In U.S. Pat. No. 5,297,844 by Haustein, a removable cab and hunting stand are attached to an ATV. Other patents showings attachment of stands to ATVs include U.S. Pat. No. 4,614,252 by Tarner, U.S. Pat. No. 4,625,831 to Rogers, U.S. Pat. No. 4,696,374 to Hale, U.S. Pat. No. 4,787,477 to Dolan and U.S. Pat. No. 4,800,986 to Hayes.

BRIEF SUMMARY OF THE INVENTION

A portable, slidably retractable and removable structure can be installed on a lightweight open land vehicle, such as an ATV. The structure includes a guide track for mounting on the vehicle to define a pair of longitudinal rail guides. An enclosure includes a pair of longitudinal rails along its bottom edges that are slidable in the rail guides. The enclosure is positioned on the guide frame and is movable between forward and rearward positions. When the enclosure is in a forward position, it is positioned over the vehicle, and can act as a cab for the vehicle. When the enclosure is in a rearward position, the rearward portion of the enclosure is located behind the vehicle. In the rearward position, the enclosure can be used for hunting, camping, and fishing.

DETAILED DESCRIPTION

Figure 1A:
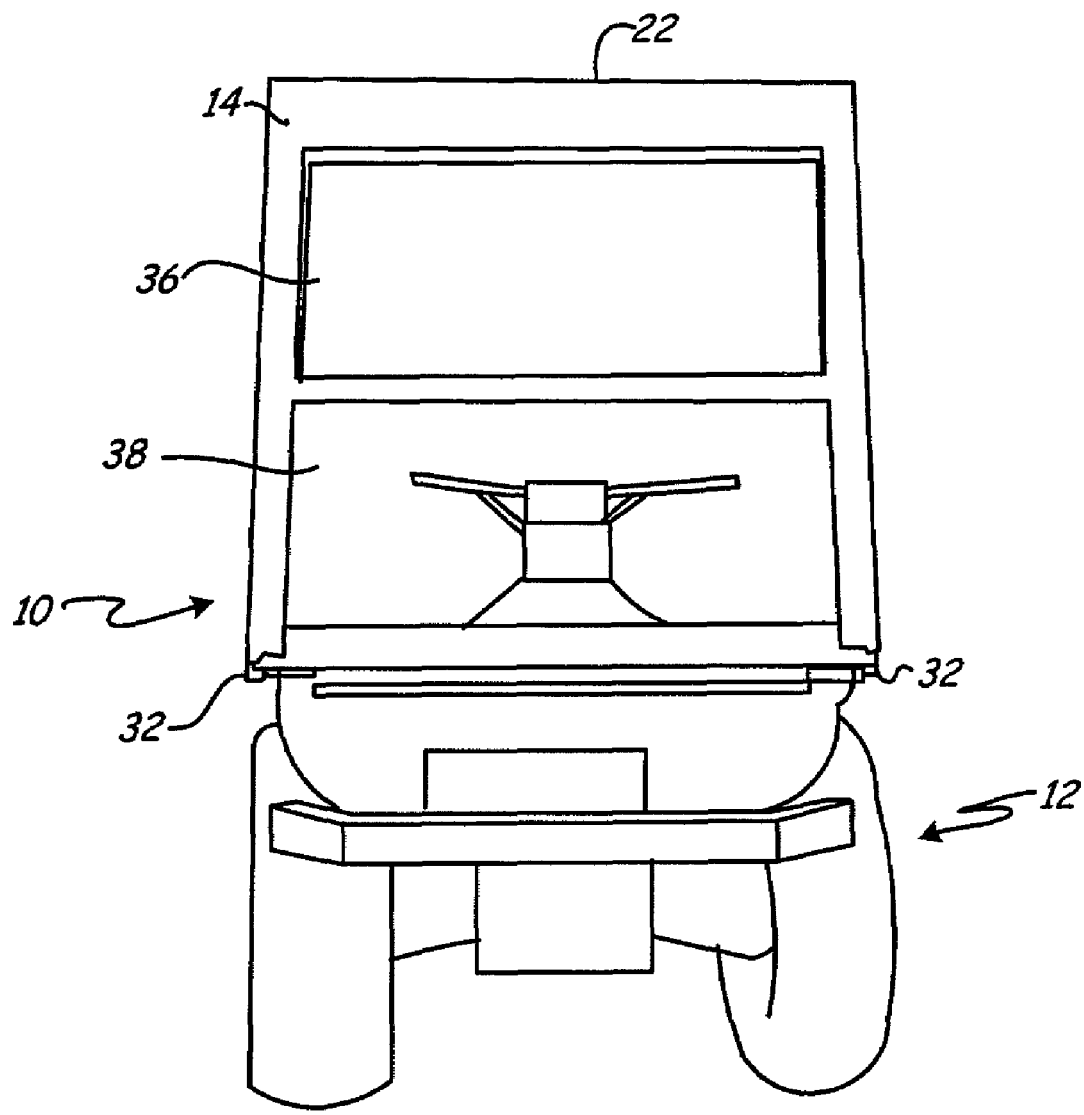
FIGS. 1A-1D shows front, left side, rear, and right side perspective views of a slidably retractable structure on an ATV.
Figure 1B:
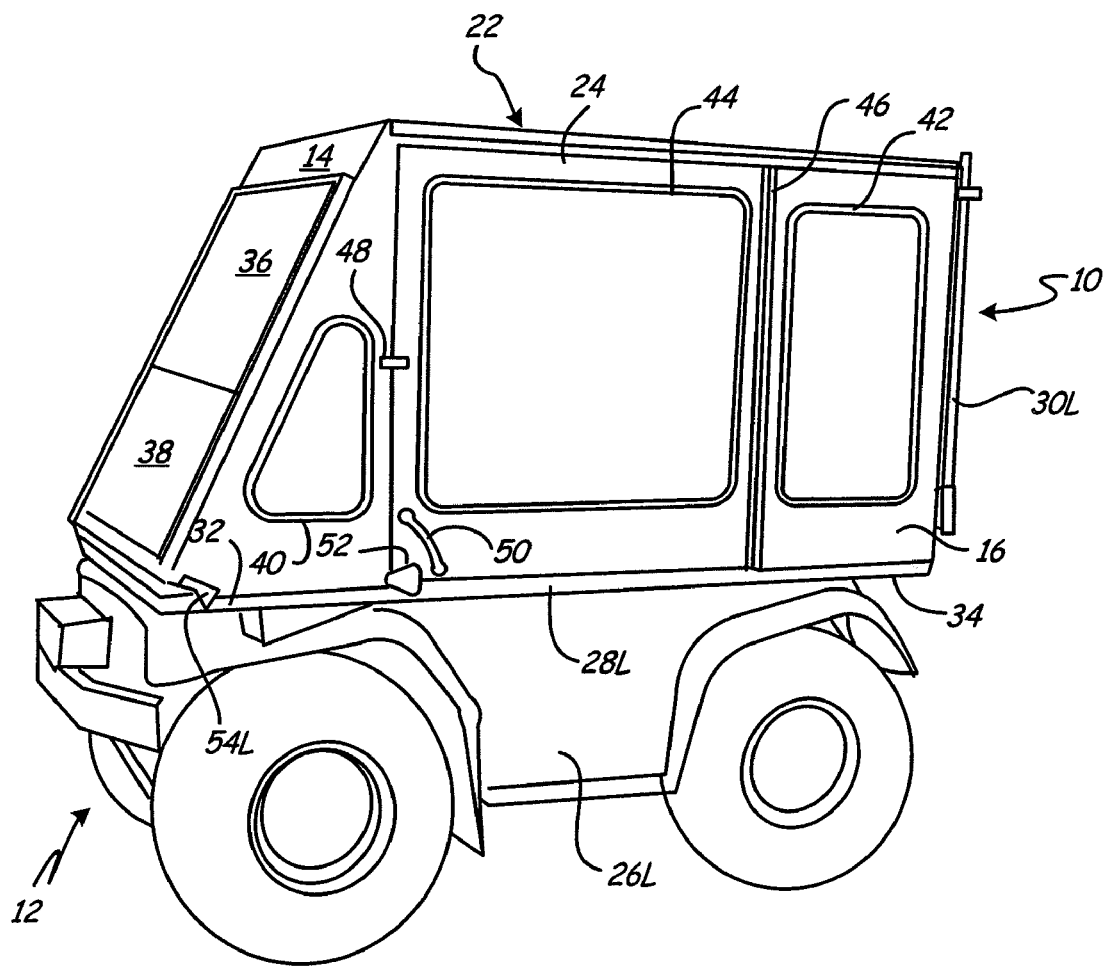

FIGS. 1A and 1B show a first embodiment of enclosure 10 mounted on ATV 12. Enclosure 10 includes front wall 14, left side wall 16, right side wall 18, rear wall 20, top 22, door 24, retractable footwell covers 26L and 26R, slide rails 28L and 28R, and extendable rear support legs 30L and 30R. Slide rails 28L and 28R slide along a guide track defined by front guide track section 32 and rear guide track section 34 mounted on ATV 12.

FIG. 1A shows enclosure 10 in its forward position. In this position, enclosure 10 acts as a cab for ATV 12.

As shown in FIGS. 1A-1D, windows are provided in each of front wall 14, left side wall 16, right side wall 18, rear side wall 20 and door 24. Upper windshield window 36 and lower windshield window 38 are mounted in front wall 14. Lower window 38 is slidable or hinged so that it can be moved upward to a position in front of upper window 36. When enclosure 10 is being moved forward or rearward on guide track sections 32 and 34, lower window 38 is moved out of the way so that it does not interfere with the handlebars of ATV 12.

Left side wall 16 includes side windows 40 and 42, and door 24 includes side window 44. As shown in FIG. 1B, door 24 is pivotally mounted by hinge 46, and includes door latch 48, door handle 50, and doorstop 52. Also shown in FIG. 1B is latch 54L, which is pivotally mounted at the front end of left side wall 16 to hold enclosure 10 in either its forward position shown in FIGS. 1A-1D, or in a retracted rearward position described later. In FIG. 1B, latch 54L is shown engaging a notch in front guide section 32 to prevent rearward movement of enclosure 10 with respect to ATV 10.

Figure 1C:
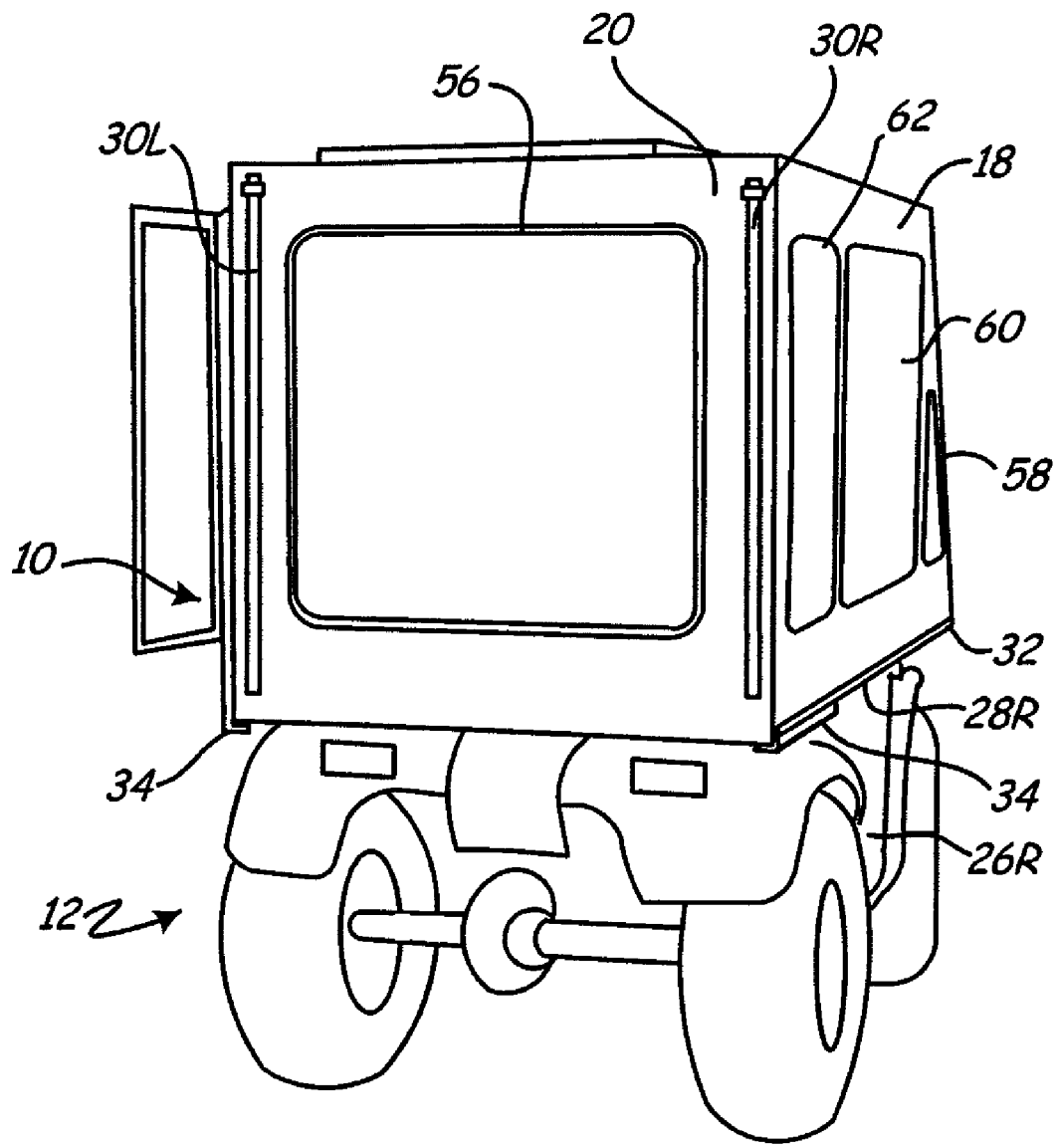
Figure 1D:
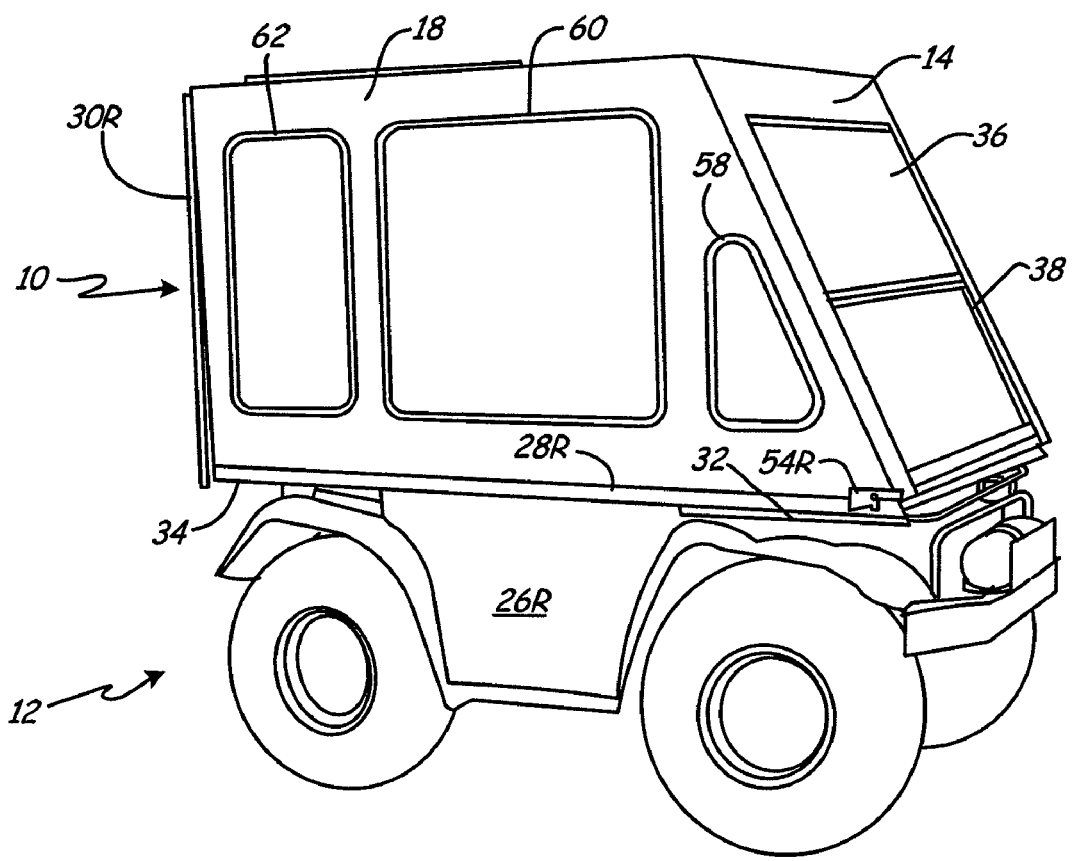

As shown in FIG. 1C, rear window 56 is mounted in rear wall 20. Rear support legs 30L and 30R can also be seen in FIG. 1C. Right side wall 18 includes side windows 58, 60 and 62. Also shown in FIG. 1D is latch 54R, which is similar to latch 54L.

Figure 2:
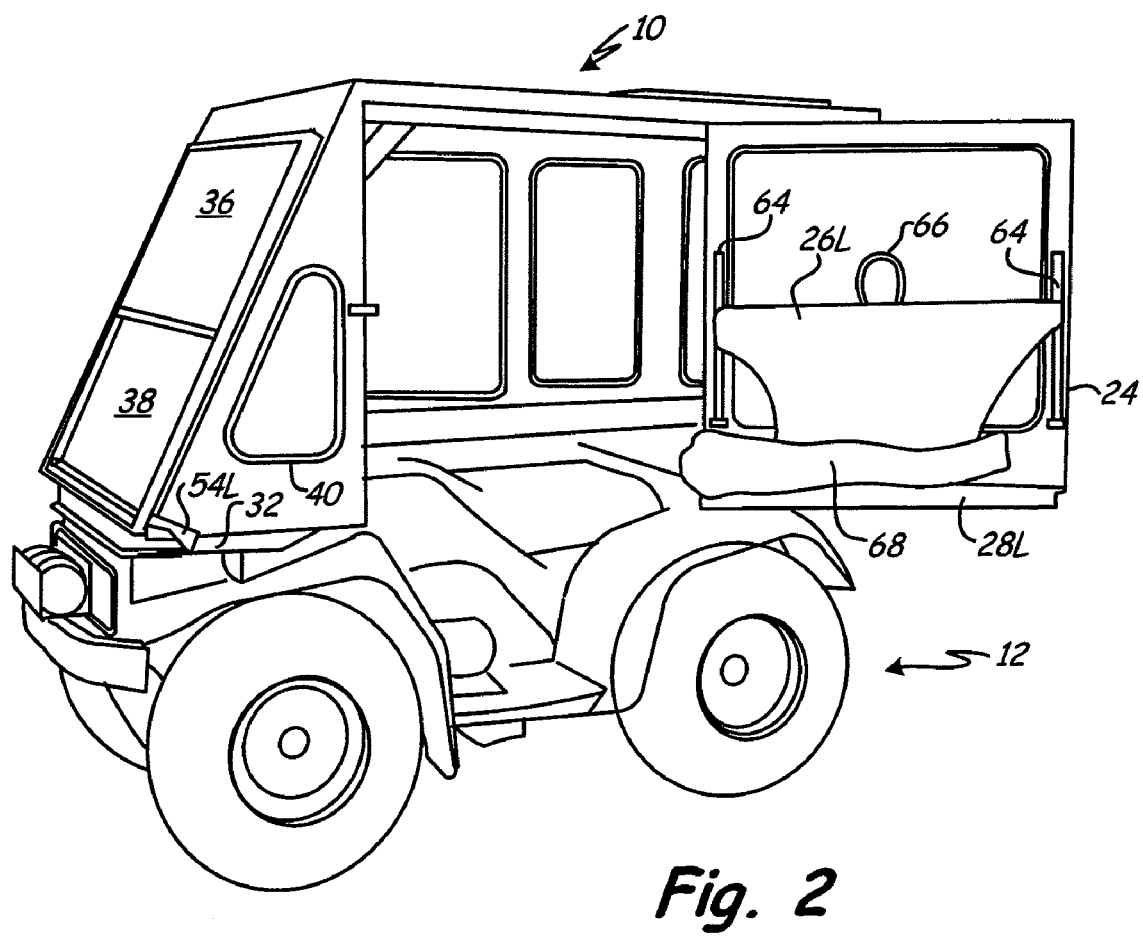
FIG. 2 is a left side perspective view of the enclosure and ATV of FIG. 1 with the left side door of the enclosure open.

FIG. 2 shows a left side perspective view of enclosure 10 and ATV 12, with retractable footwell cover 26L retracted upward and with door 24 in an open position. Retractable footwell cover 26L is slidable along vertical track 64 on the inner wall of door 24. Shown in FIG. 2, flexible loop 66 is attached to the upper edge of the footwell cover 26L to assist in raising and lowering footwell cover 26L. A similar mechanism is used to raise and lower right footwell cover 26R. Covers 26L and 26R must be retracted upward when enclosure 10 is moved either forward or rearward on guide tracks 32 and 34.

As shown in FIG. 2, left rail 28L is segmented, so that door 24 can be opened. A portion of left rail 28L is shown along the bottom edge of door 24.

Flexible curtain or skirt 68 is shown bundled and attached to the inside lower portion of door 24. Skirt 68 can be held in place, for example by snap fasteners or by hook and loop fasteners, and can be unfurled and lowered to the ground when enclosure 12 is in a rearward position and is being used, for example, for a camping or hunting enclosure. Similar bundled or folded skirts are positioned along the lower inner surfaces of rear wall 20, right side wall 18, and left side wall 16.

Figure 3:
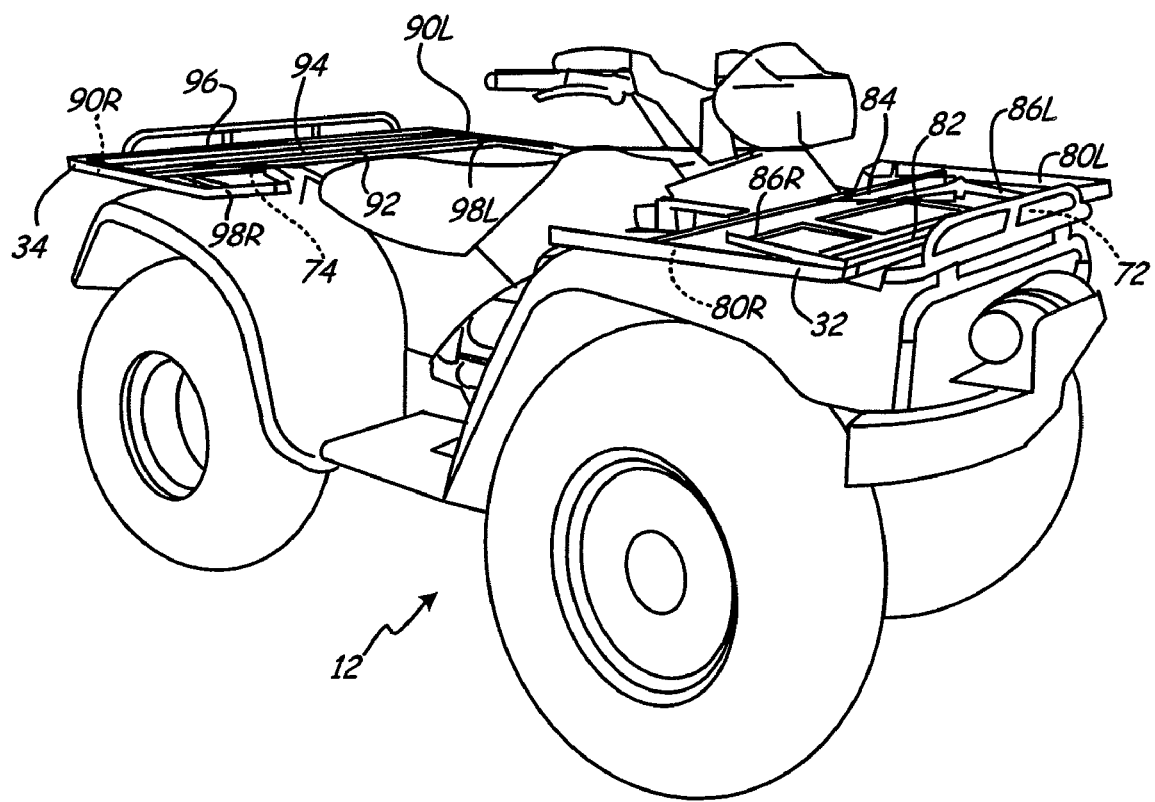
FIG. 3 shows the ATV with front and rear guide track sections mounted on front and rear racks of the ATV.

FIG. 3 shows ATV 12 with enclosure 10 removed. In FIG. 3, front guide track section 32 is mounted on front rack 72 of ATV 12. Similarly, rear guide track 34 is mounted on rear rack 74 of ATV 12. Guide track sections 32 and 34 are attached to racks 72 and 74, for example, by clamps, such as hose clamps, so that user may remove rail sections 32 and 34, if desired, when ATV 12 is not being used with enclosure 10.

Front guide track section 32 is a frame that includes left guide 80L, right guide 80R, cross bars 82 and 84, and mounting channels 86L and 86R. Rear guide track section 34 is a frame that includes left and right guides 90L and 90R, cross bars 92, 94, and 96, and mounting channels 98L and 98R.

When mounted on ATV 12, front guide track section 32 and rear guide track section 34 are aligned, so that guides 80L and 90L are aligned, and guides 80R and 90R are aligned.

Figure 4:
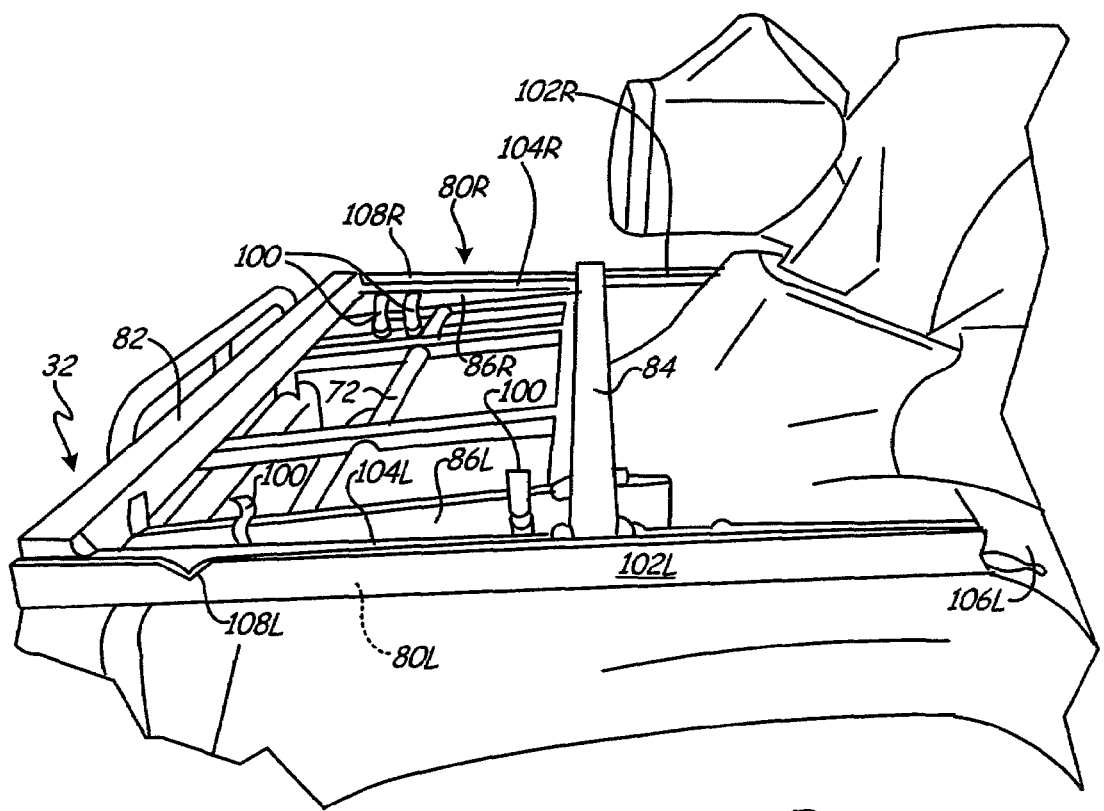
FIG. 4 is a left side perspective view showing the front guide track section mounted to the front rack of the ATV.
Figure 5:
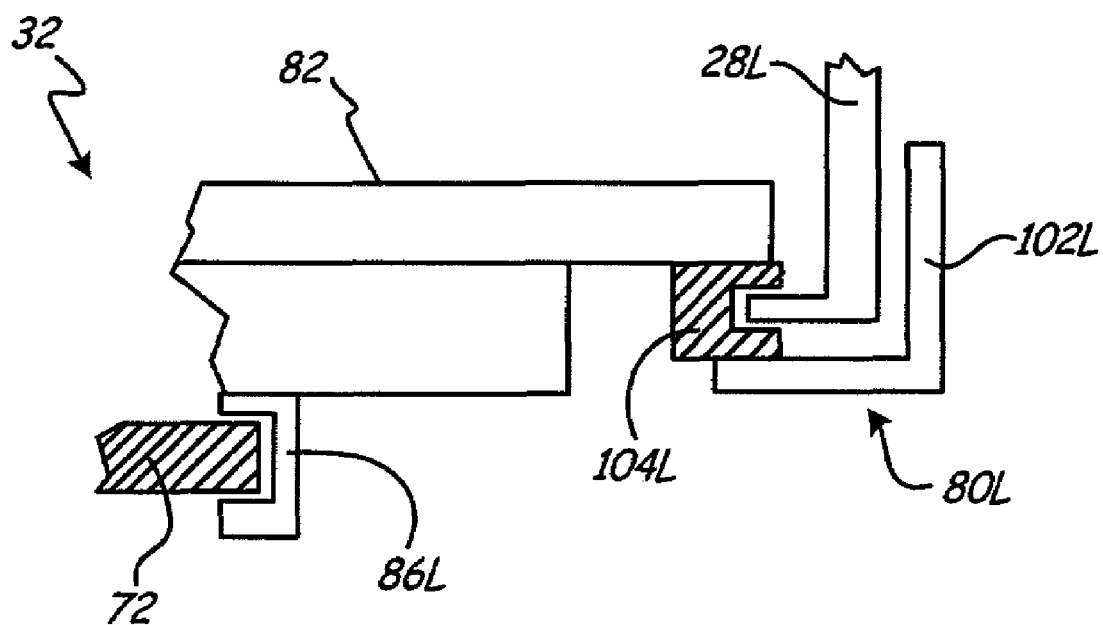
FIG. 5 is a partial front view of the front guide track section.
Figure 6:
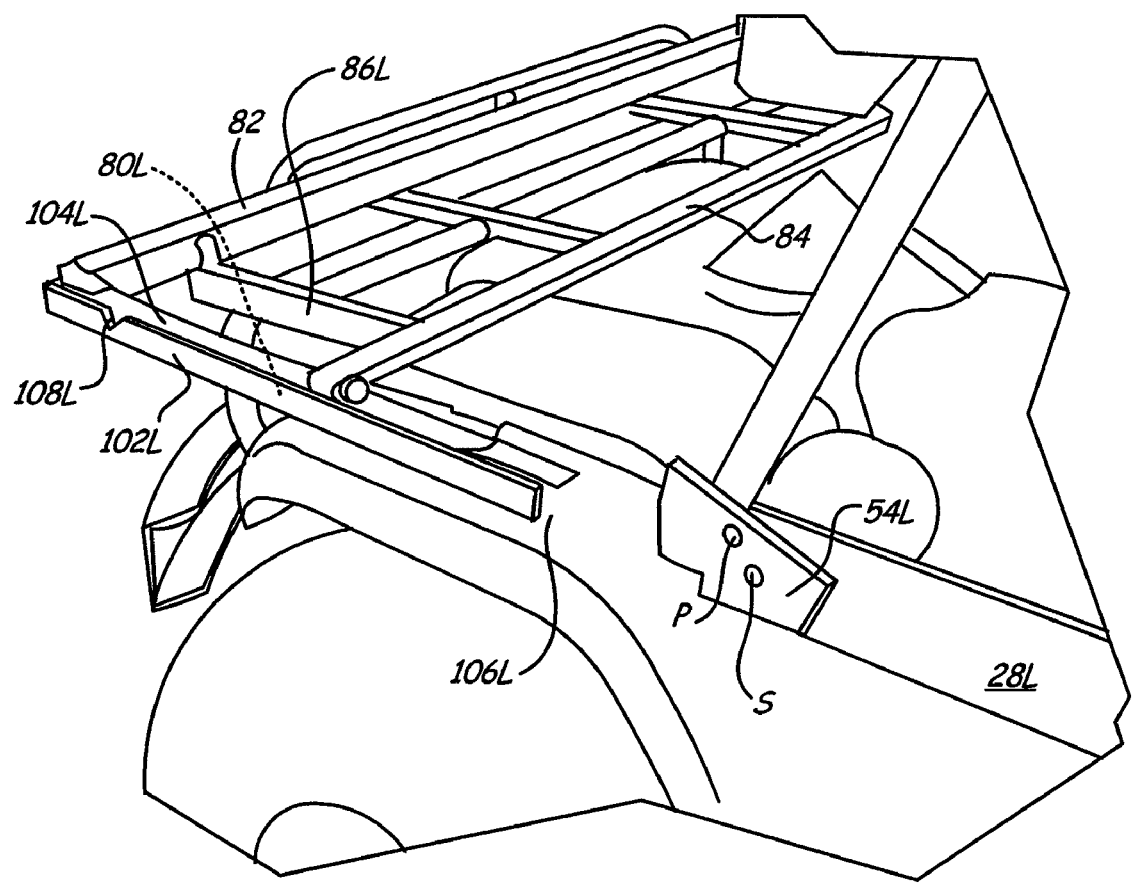
FIG. 6 is a perspective view of the front guide track section and a forward end of the enclosure (with outer panels removed).

FIGS. 4-6 show front guide track section 32 in more detail. FIG. 4 is a perspective view from the left side of the guide track section 32 on ATV 12. Front guide track section 32 includes left guide 80L, right guide 80R, transverse bars 82 and 84 and mounting channels 86L and 86R, which capture the left and right sides, respectively of front rack 72. Hose clamps 100 attach bars 86L and 86R to the sides of rack 72. Front crossbar 82 abuts the upturned front end of rack 72.

Left guide 80L is defined by L-shaped member 102L, and C-shaped inner member 104L. Similarly, right guide 80R is defined by L-shaped outer member 102R and C-Shaped inner member 104R. Guides 80L, 80R, include guide lip 106L, 106R (not shown in FIG. 5) at their rearward ends and notch 108L, 108R near their forward ends. Lips 106L, 106R help guide rails 28L and 28R of enclosure 10 into guides 80L and 80R, respectively. Notches 108L, 108R interact with latches 54L and 54R, respectively carried by enclosure 10, to lock enclosure 10 in the forward position shown in FIGS. 1A-1D.

FIG. 5 is a front view of a left side portion of guide track section 32. Rail 28L is shown in the L-shaped guide track defined by outer member 102L and inner member 104L.

FIG. 6 is a perspective view that shows how the front end of enclosure 10, and particularly rail 28L, is guided into front guide 80L. Lip 106L is downturned, so that the leading edge of rail 28L will be guided upward and into the L-shaped channel defined by members 102L and 104L of guide 80L. As rail 28L is advanced forward into guide 80L, latch 54L will pivot in a counterclockwise direction about pivot pin P, until the rearward or corner of latch 54 reached and drops into notch 108L. The interaction of latch 54L and notch 108L will prevent enclosure 10 from moving rearward until the user pivots latch 54L to lift the lower corner of latch 54L out of notch 108L. A similar action is required on the other side with latch 54R and notch 108R.

Latches 54L and 54R are asymmetric with respect to pivot pins P, so that they will naturally drop into notches 108L, 108R by gravity. Stop pins S limit the downward movement of the lower corners of latches 54L, 54R.

Figure 7:
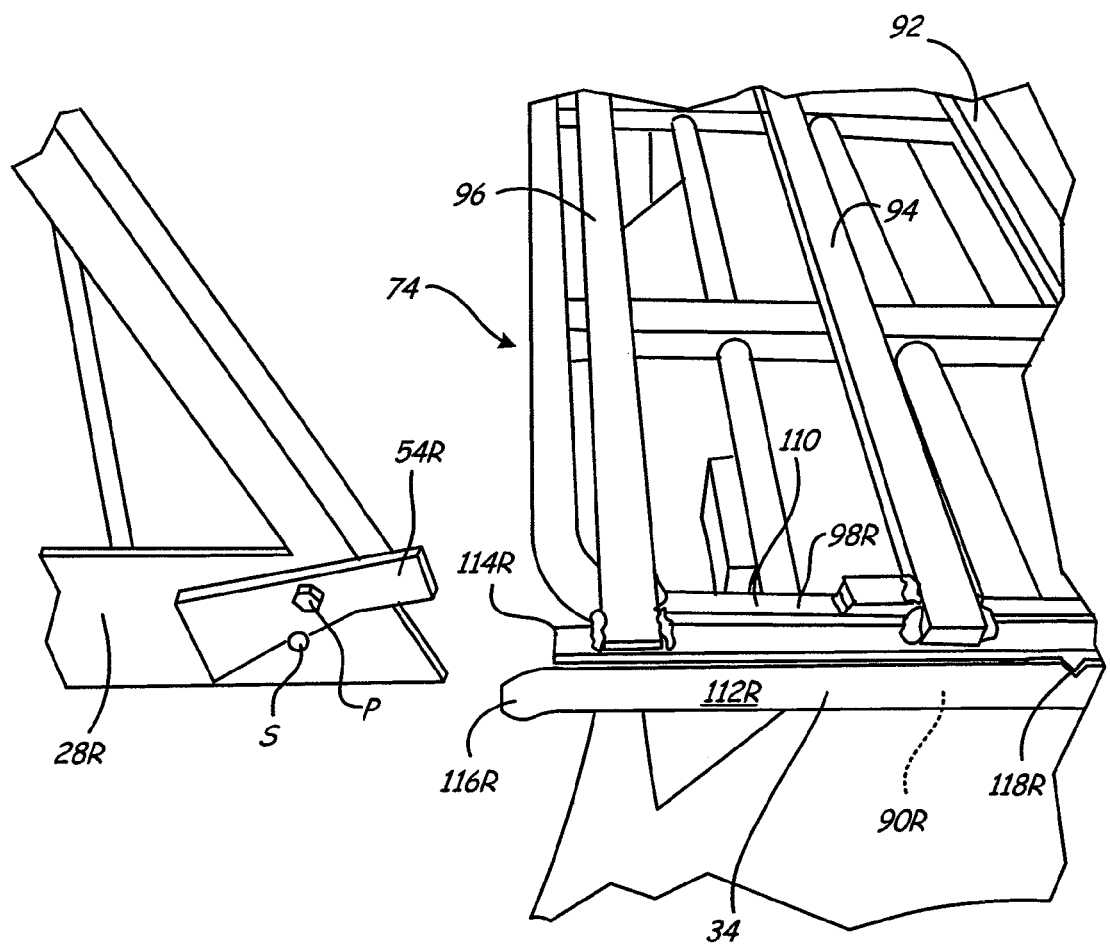
FIG. 7 is a right side partial perspective view showing a forward end of the enclosure and a rearward end of the rear guide track section.

FIG. 7 shows a partial perspective view of the right rear corner of rear guide track section 34 and rear rack 74. Shown in FIG. 7 is right guide 90R, crossbars 92, 94, and 96, mounting channel 98R and clamp 110. Right guide 90R includes L-shaped outer member 112R and C-shaped inner member 114R. Left guide 90L (shown in FIG. 8) has a similar structure. Outwardly turned lip 116R is located at the rearward end of outer member 112R to help guide rail 28R of enclosure 10 into right guide 90R.

At the forward end of guide 90R, the vertical wall of outer member 112R tapers downward, and includes notch 118R for engaging latch 54R to lock enclosure 10 in a retracted rearward position.

Figure 8:
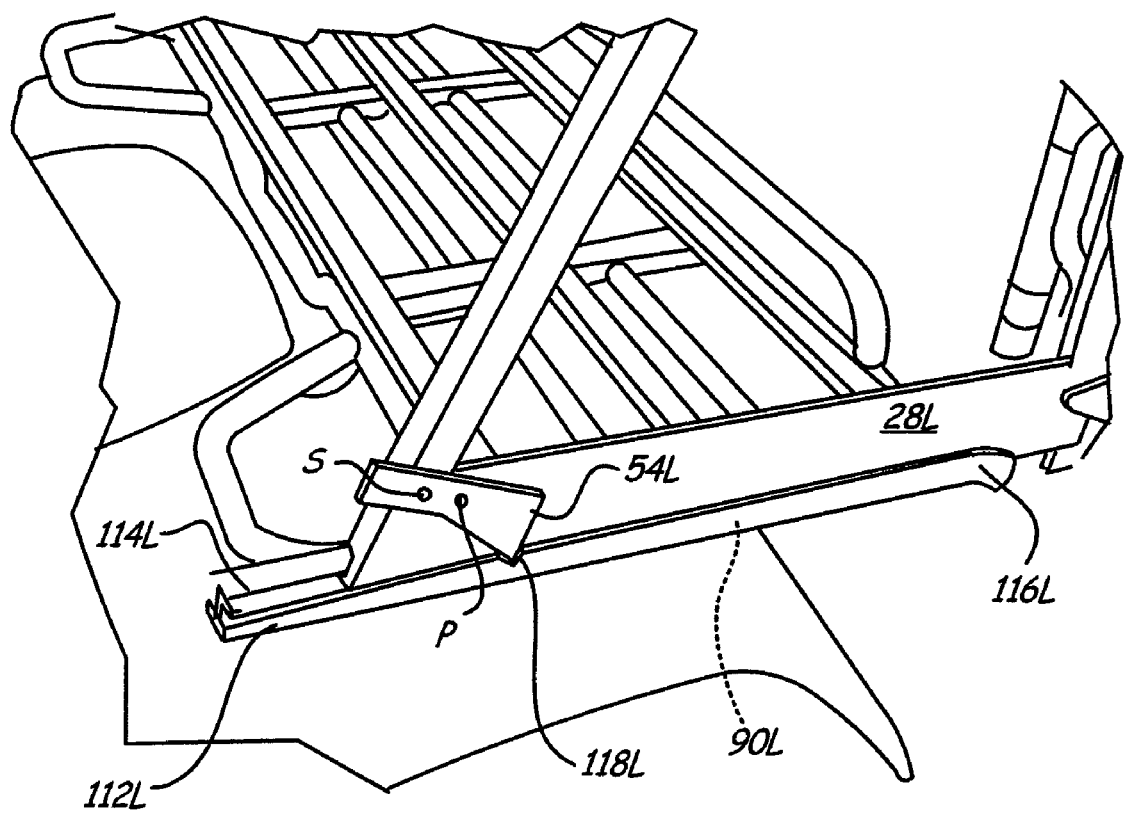
FIG. 8 shows the forward end of the enclosure frame positioned on the rear guide track section, with a latch engaging a notch in the rear guide track.

FIG. 8 shows the forward end of enclosure 10 positioned in rear guide 90L with latch 54L positioned in notch 118L. In this position, enclosure 10 cannot be moved further rearwardly without first releasing latches 54L and 54R from notches 118L and 118R respectively. However, because of the shape of latch 54L and 54R and the position of pivot pin P, enclosure 10 can be moved forward from the position shown in FIG. 8 without having to release latches 54L and 54R from notches 118L and 118R.

Figure 9A:
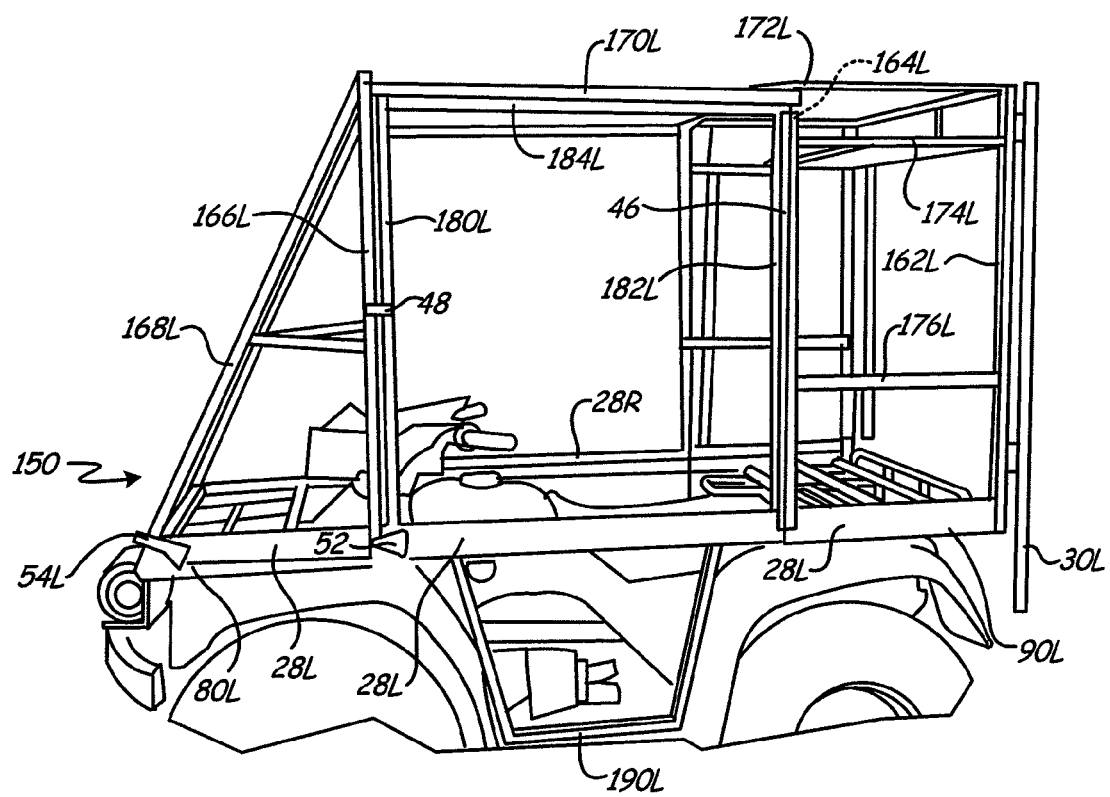
FIGS. 9A and 9B show left side and right side views showing the frame of the enclosure (with outer cover panels removed) on the ATV.
Figure 9B:
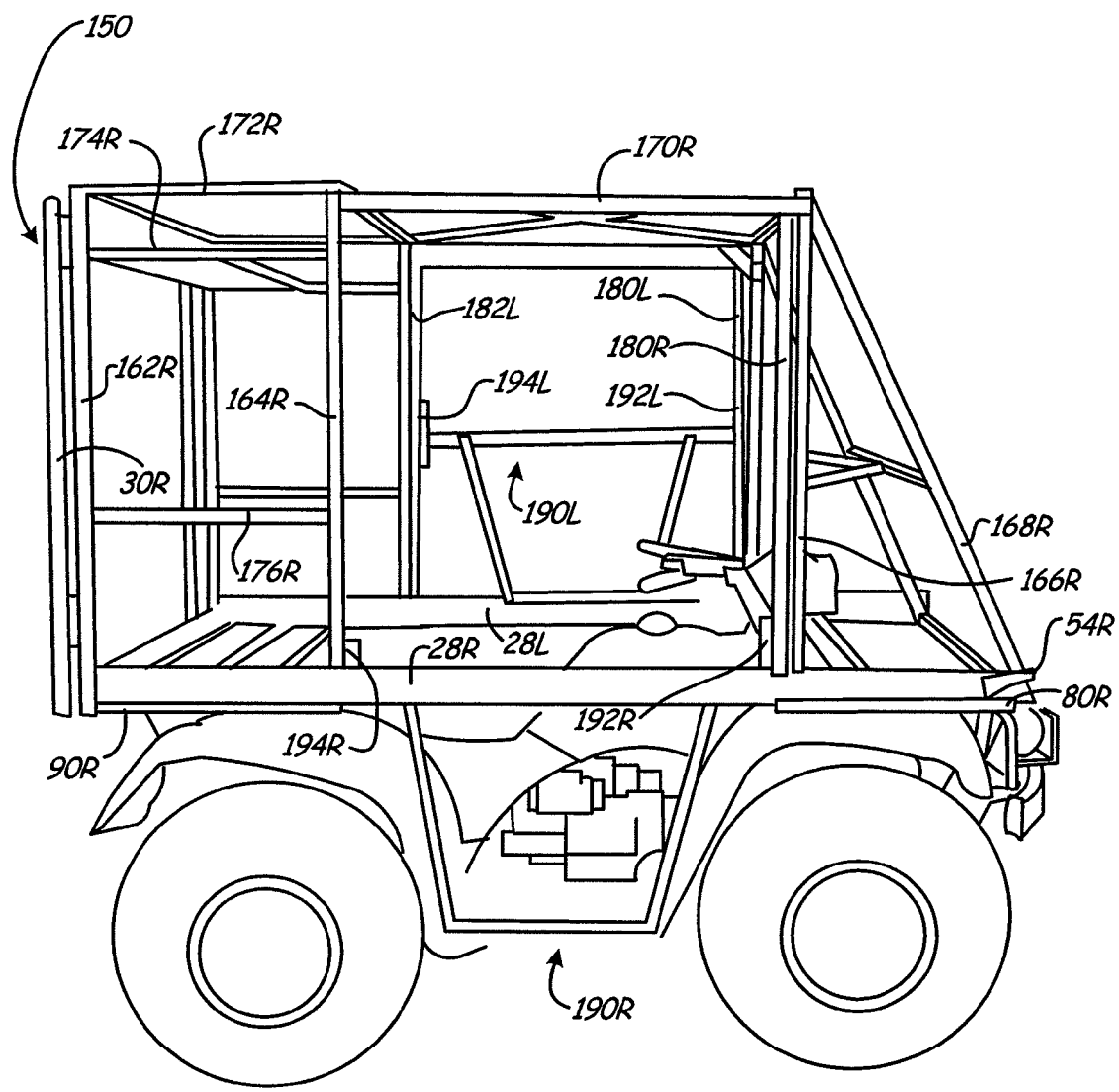
Figure 10:
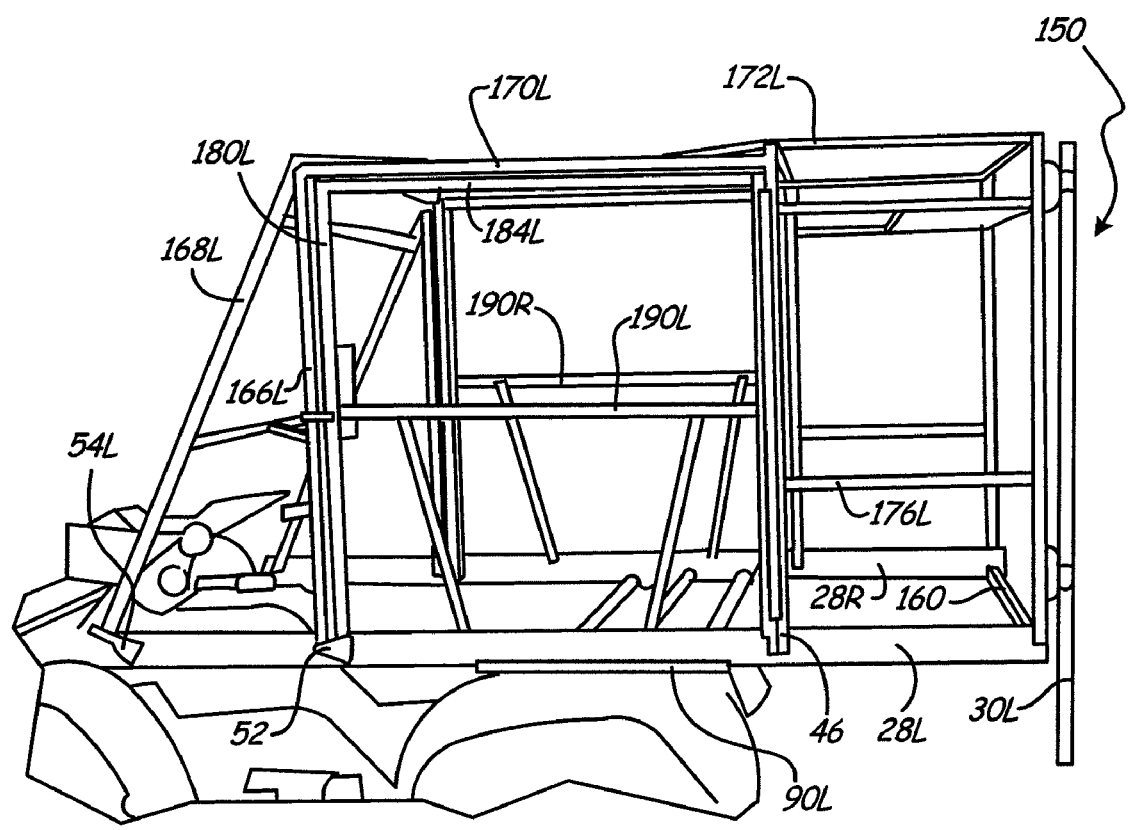
FIG. 10 shows a left side view with the enclosure frame of FIGS. 9A and 9B moved rearward with respect to the ATV.
Figure 11:
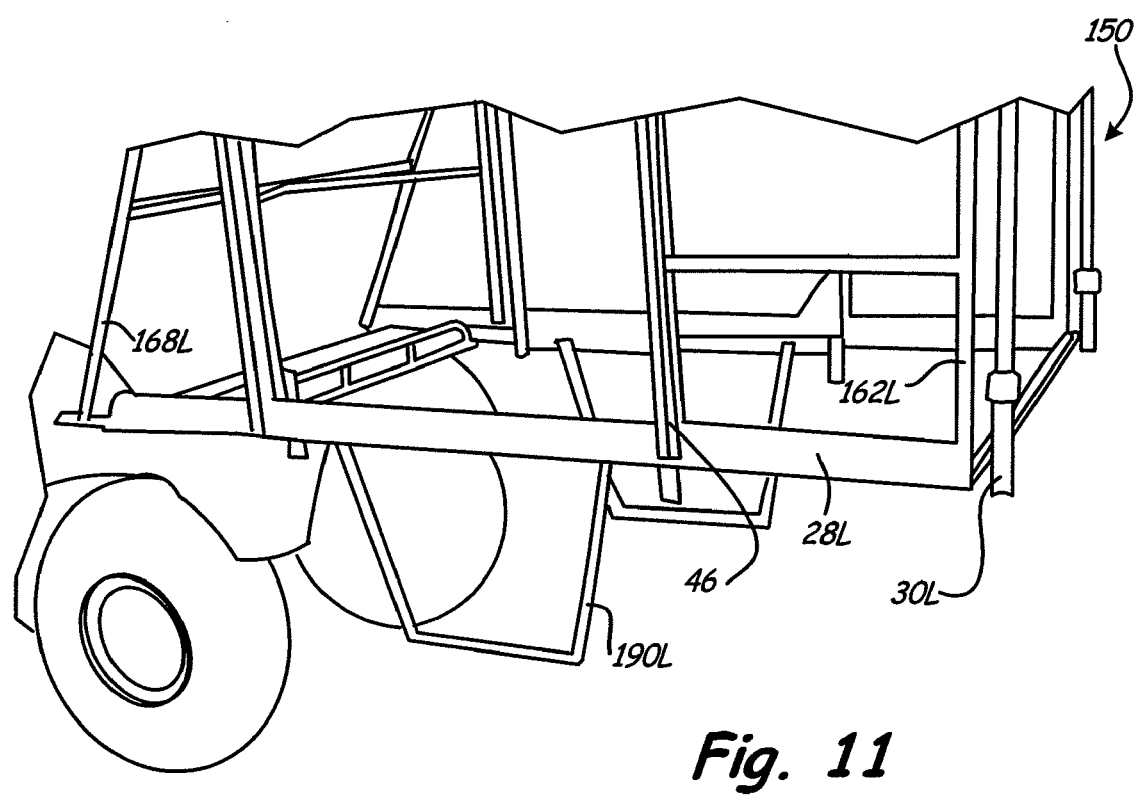
FIG. 11 shows a perspective view of the enclosure frame in a rearward position with respect to the ATV.
Figure 12:
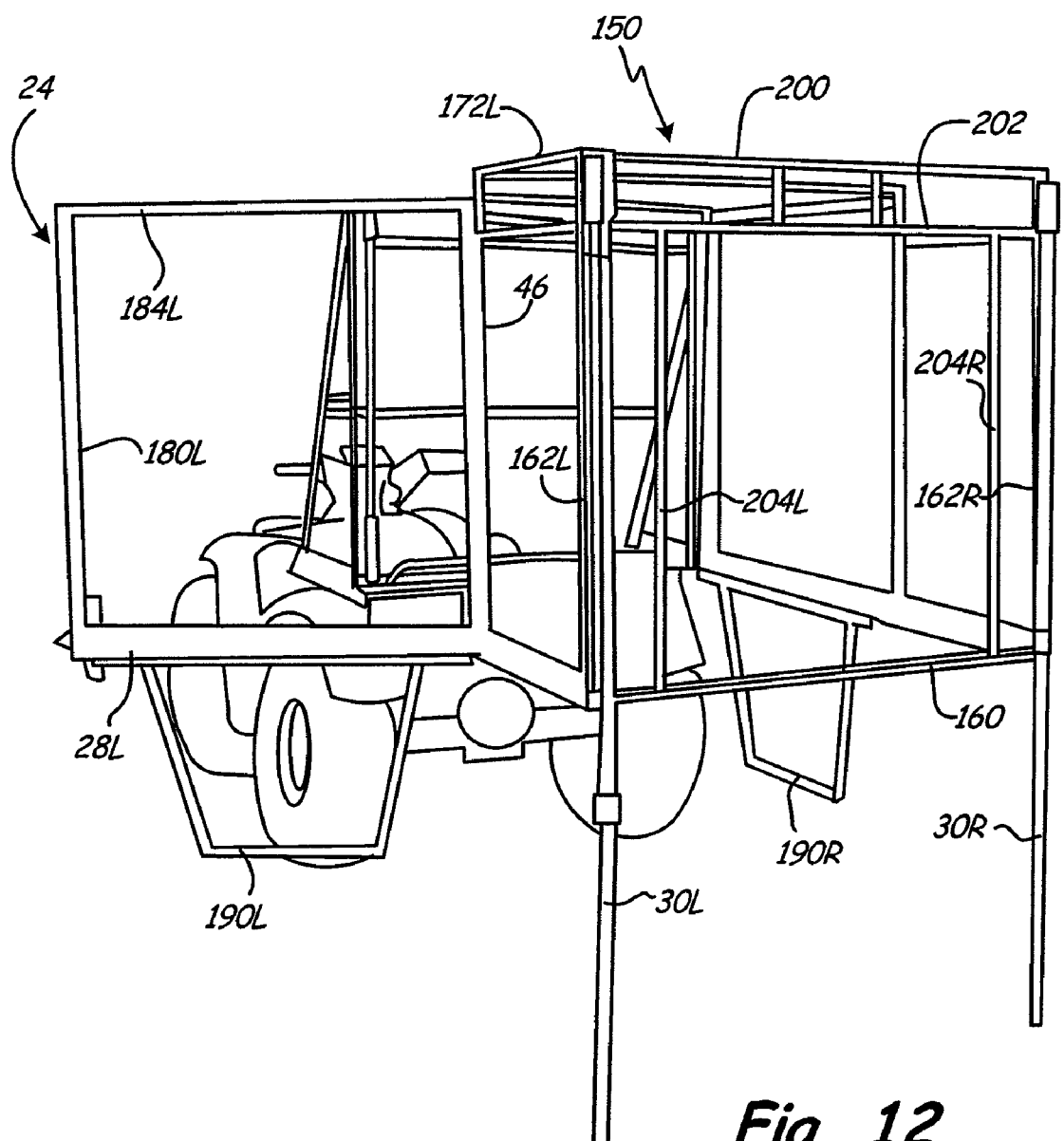
FIG. 12 shows a rear perspective view of the enclosure frame and ATV, with the enclosure in a rearward position and the left side door open.
Figure 13:
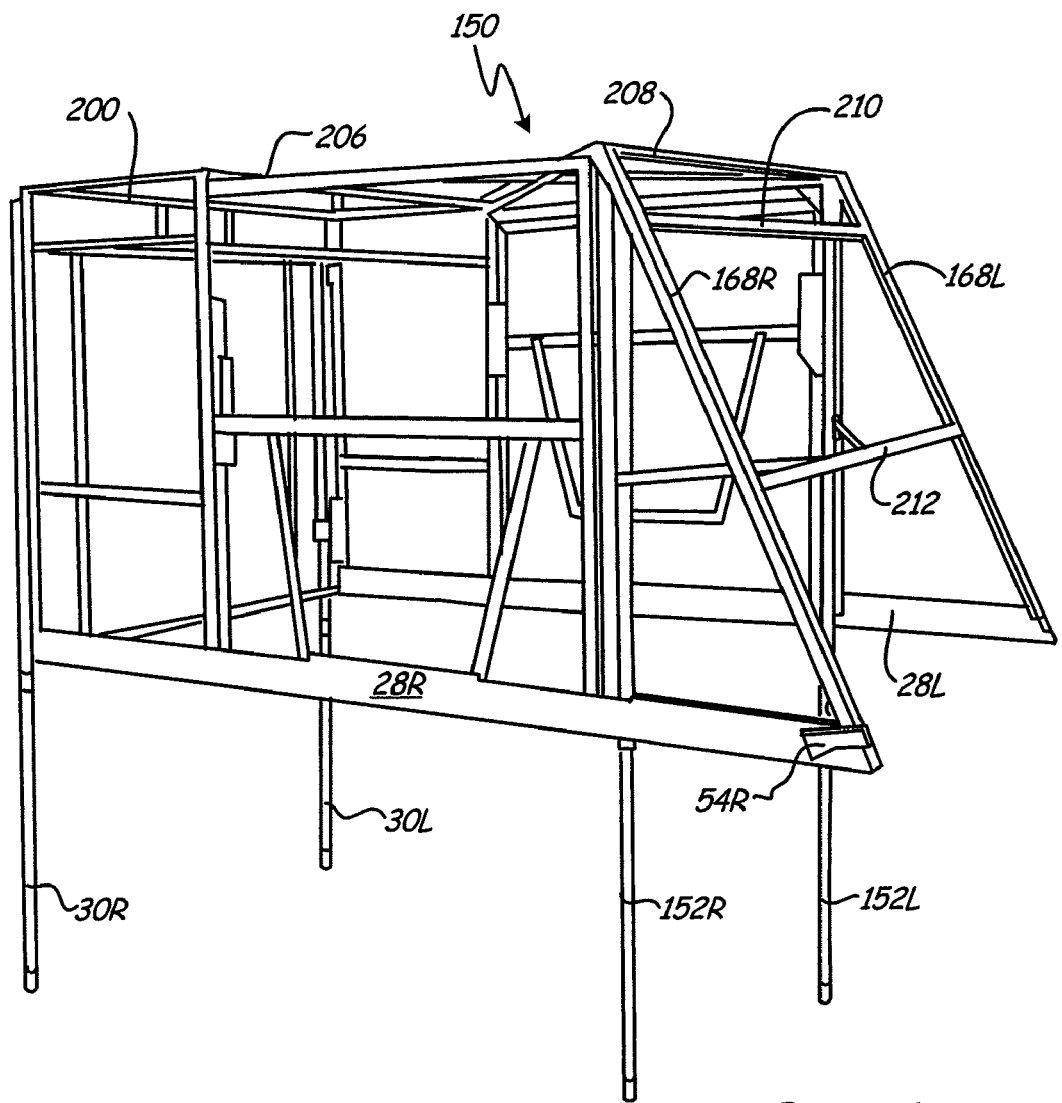
FIG. 13 shows a right side perspective view of the enclosure frame supported on four legs and separate from the ATV.

In the remaining FIGS. 9A-13, enclosure 10 is shown with outer covering panels removed, so that framework 150 can be seen. FIGS. 9A and 9B show framework 150 mounted on ATV 10 in the forward position, similar to the position shown in FIGS. 1A-1D. FIG. 10 shows framework 150 partially retracted by sliding rearward with respect to ATV 10. In FIGS. 11 and 12, framework 150 has been moved to the rearward position, where the front end of framework 150 is latched by latches 54L and 54R to rear guides 90L and 90R, respectively. Framework 150 extends behind ATV 10, while the forward end is supported by guides 90L and 90R. FIG. 11 shows framework 150 before legs 30L and 30R are lowered, while FIG. 12 shows legs 30L and 30R lowered, and door 24 open. FIG. 13 shows framework 150 standing free of ATV 110. In FIG. 13, front support legs 152L and 152R have been lowered in addition to rear support legs 30L and 30R.

Rails 28L and 28R and rear crossbar 160 (as shown in FIG. 10-13) form a U-shaped base for framework 150. Rails 28L and 28R are L-shaped members, with their lower horizontal flanges turned inward so that rails 28L and 28R can be accepted within their respective guides, 80L, 90L and 80R, 90R.

The left side of framework 150 is formed by vertical members 162L, 164L, and 166L, inclined front member 168L, and horizontal members 170L, 172L, 174L, and 176L. Also shown in FIG. 9A is the framework for door 24 (removed), which includes a portion of rail 28L, together with vertical members 180L and 182L, and horizontal member 184L. Framework 190L for left footwell cover 26L is also shown in FIG. 9A in its lowermost position.

As shown in FIG. 9B, the right side of framework 150 is formed by vertical members 162R, 164R, 166R, and 180R, forward inclined member 168R, and horizontal members 170R, 172R, 174R, and 176R. Frame 190R of right footwell cover 26R is shown in its lowermost position in FIG. 9B.

Also in FIG. 9B, frame 190L of left footwell cover 26L is shown in a raised position. Frame 190L includes pair of guides 192L and 194L that ride on a track defined by 180L and 182L, respectively. Similar guide members 192R and 194R, and frame 190R, are also shown in FIG. 9B.

As shown in FIG. 9A, vertical member 182L of door 24 (removed) is pivotally connected to vertical member 164L of framework 150 by hinge 46.

In FIG. 10, framework 150 has been pulled rearwardly, so that the back portion of 150 extends behind ATV 10. Framework 150, however, is not yet at its fully retracted rearward position as shown in FIGS. 11 and 12. In FIG. 10, both frames 190L and 190R have been pulled upward so that they will not interfere with the fenders of ATV 12, as enclosure 10 is retracted.

FIG. 12 shows framework 150 in the fully retracted position, in which only the front end is supported by ATV 12. The front portions of rails 28L and 28R are located in rear guides 90L and 90R, respectively.

In FIG. 12, the rear portion of framework 150 can be seen. It includes lower crossbar 160, upper crossbars 200 and 202, vertical members 162L and 162R, and vertical members 204L and 204R.

As shown in FIG. 13, the top of framework 150 is defined by rear crossbar 200, intermediate crossbar 206, and forward crossbar 208. The front portion of frame 150 includes inclined members 168L and 168R, topped cross member 208, and crossbars 210 and 212.

Enclosure 10 provides a portable, slidably retractable hunting and camping enclosure that also acts as an ATV cab enclosure. It is lightweight, and can easily be moved between positions by one person. The user is not required to lift enclosure 10 while out in the field. The positioning of enclosure 10 with respect to ATV 12, including removing it entirely from ATV 12, can be achieved with a sliding movement of rails 28L, 28R, in front guides 80L, 80R and rear guides 90L, 90R.

The ability to move enclosure 10, so that it is no longer mounted directly over ATV 12, is important for use as a hunting enclosure. Many states have restrictions on hunting from within a vehicle. By moving enclosure 10 to its rearward position, as illustrated in FIGS. 11 and 12, or entirely off ATV 12, as illustrated in FIG. 13, enclosure 10 can be used for hunting, even in those states that prohibit hunting from a vehicle.

The use of drop-down curtains or skirts, which are carried on the lower inner surfaces of enclosure 10, allows enclosure 10 to be fully enclosed. This is an advantage for both hunting and camping.

Although the present invention has been described with reference to preferred embodiments, workers skilled in the art will recognize that changes may be made in form and detail without departing from the spirit and scope of the invention. For example, although the movement of enclosure 10 has been shown using rails 28L and 28R and guide track sections 32 and 34, other arrangements for providing movement are possible. Rails 28L and 28R can carry rollers, for example, to reduce friction in the movement of enclosure 10. In addition, enclosure 10 can be a plastic structure made by rotomolding, and the outer walls and framework can be an integrated structure.

The invention claimed is:

1. A portable, slidably retractable and removable structure for installation on a lightweight, open vehicle, the structure comprising:
   a guide track for fixed mounting on one side of the vehicle to define longitudinal guides, the guide track including a first guide track section mountable to a front portion of the vehicle and a second guide track section mountable to a rear portion of the vehicle; and
   an enclosure mounted on the guide track and movable between a forward position in which the enclosure is positioned over the vehicle, and a rearward position in which a forward portion of the enclosure is positioned over the vehicle and a rearward portion of the enclosure is located behind the vehicle.

2. The structure of claim 1 and further comprising:
   a first pair of legs extendable downward from the rearward portion of the enclosure to support the rearward portion.

3. The structure of claim 2 and further comprising:
   a second pair of legs forward of the first pair of legs and extendable downward to support the forward portion.

4. The structure of claim 3 wherein the enclosure is movable rearwardly off the guide track to separate the enclosure from the vehicle.

5. The structure of claim 1, wherein the first guide track section is mountable to a front rack of the vehicle, and the second guide track section is mountable to a rear rack of the vehicle.

6. The structure of claim 1 and further comprising:
   a latch carried on the enclosure and releasably engagable with a notch in the guide track.

7. The structure of claim 1 and further comprising:
   curtains attachable to the enclosure for extending downward from the rearward portion when the enclosure is in the rearward position.

8. The structure of claim 7, wherein the curtains are positioned along inner lower portions of the enclosure when not in use.

9. The structure of claim 1, wherein the enclosure includes longitudinal rails for slidably engaging the longitudinal guides.

10. The structure of claim 9, the longitudinal rails have an L-shaped cross-section, and wherein the longitudinal guides define a guide passage having an L-shaped cross-section.

11. The structure of claim 9, wherein the enclosure includes a framework.

12. The structure of claim 11, wherein the longitudinal rails include a left rail extending along a bottom of a left side of the framework and a right rail extending along a bottom of a right side of the framework.

13. The structure of claim 1, wherein the enclosure includes a front wall, a left side wall, a right side wall, a rear wall, a top, and a door.

14. The structure of claim 13, wherein a retractable windshield is mounted to the front wall.

15. The structure of claim 13, wherein the enclosure further includes retractable footwell covers.

16. A portable, slidably retractable and removable structure for installation on a lightweight, open vehicle, the structure comprising:
   a front guide track for fixed mounting on the vehicle to define left and right front guides;
   a rear guide track for fixed mounting on the vehicle to define left and right rear guides; and
   an enclosure having a left rail for engaging the left front guide and the left rear guide, and a right rail for engaging the right front guide and right rear guide, so that the enclosure can be moved with respect to the vehicle.

17. The structure of claim 16, wherein the front and rear guide tracks define a forward position in which the enclosure is positioned over the vehicle, and a rearward position in which a forward portion of the enclosure is positioned over the vehicle and a rearward portion of the enclosure is located behind the vehicle.

18. The structure of claim 16, wherein the enclosure includes a framework, and wherein the left rail extends along a bottom of a left side of the framework and the right rail extends along a bottom of a right side of the framework.

19. The structure of claim 16, wherein the enclosure includes a front wall, a left side wall, a right side wall, a rear wall, a top, and a door.

20. A portable, slidably retractable and removable structure for installation on a lightweight, open vehicle, the structure comprising:
   a guide track for fixed mounting on the vehicle to define longitudinal guides; and
   an enclosure that includes a front wall, a left side wall, a right side wall, a rear wall, a top, a door, and retractable footwell covers, the enclosure mounted on the guide track and movable between a forward position in which the enclosure is positioned over the vehicle, and a rearward position in which a forward portion of the enclosure is positioned over the vehicle and a rearward portion of the enclosure is located behind the vehicle.

* * * * *